Feb. 28, 1950 D. L. DAVIS 2,498,795
DISPENSING DEVICE FOR BAIT
Filed June 6, 1946 2 Sheets-Sheet 2
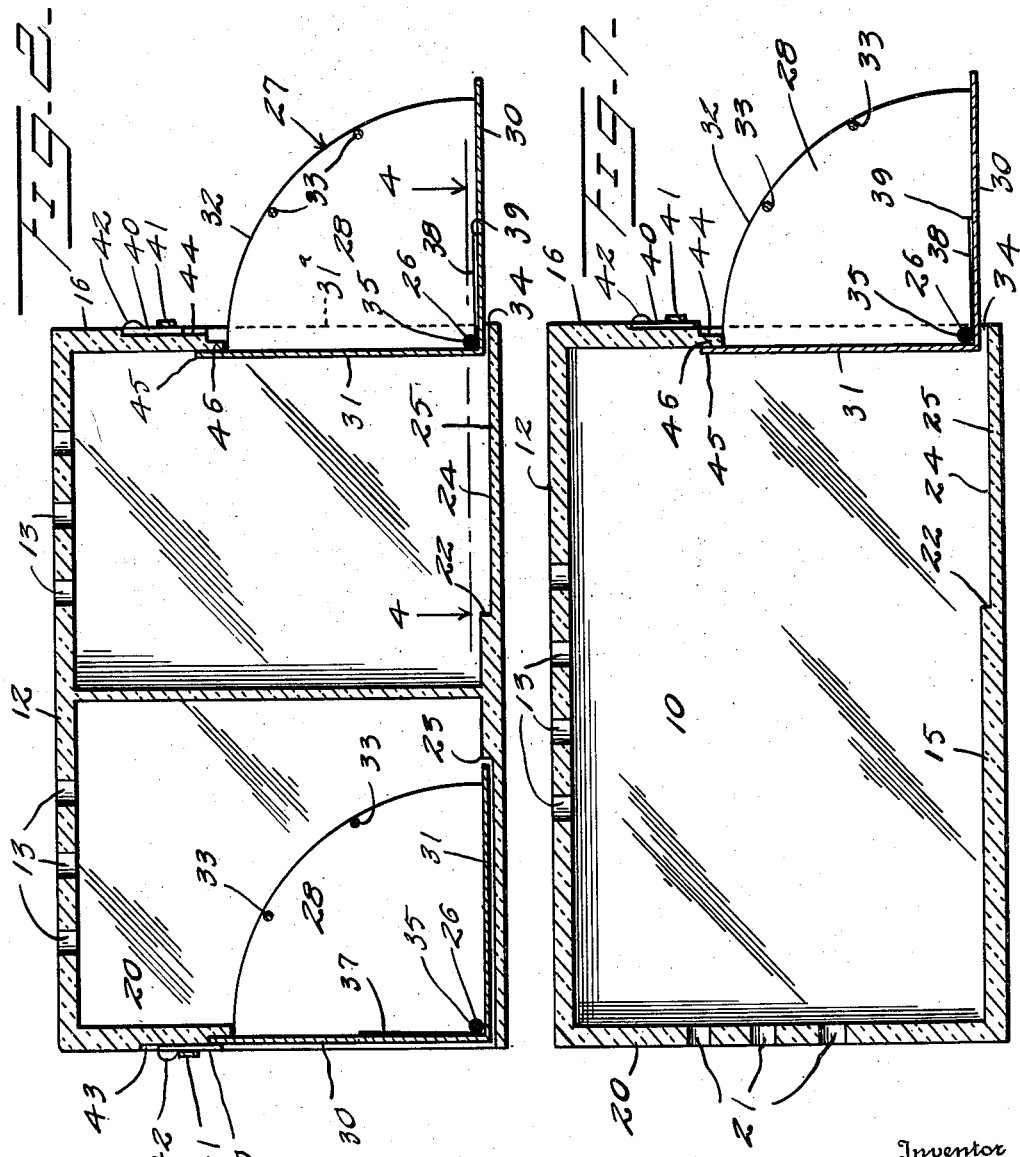
Inventor
D. L. Davis
By
Kimmel & Crowell Attorneys Patented Feb. 28, 1950

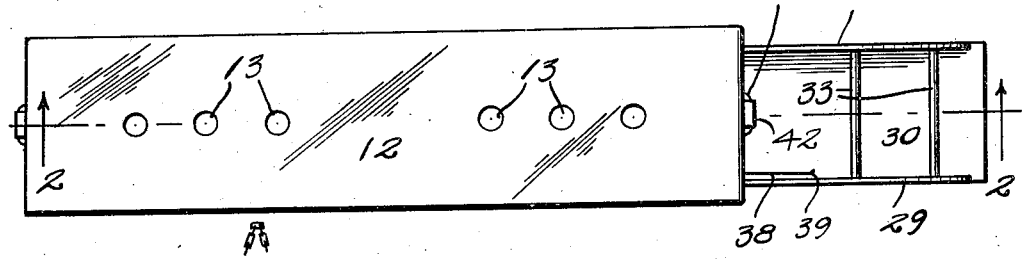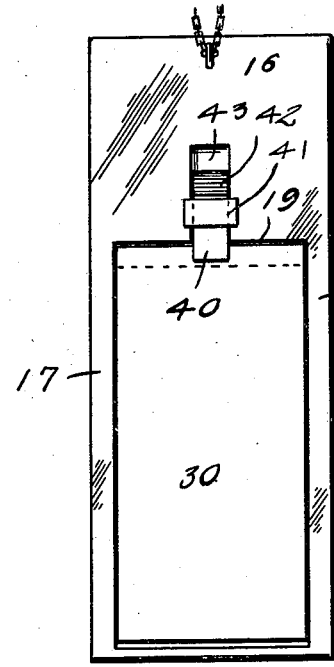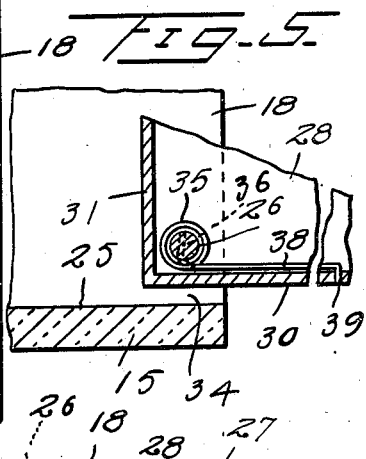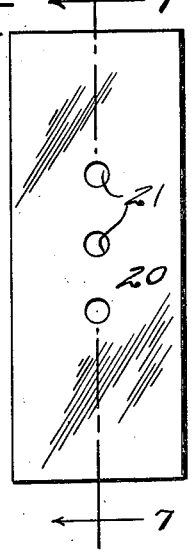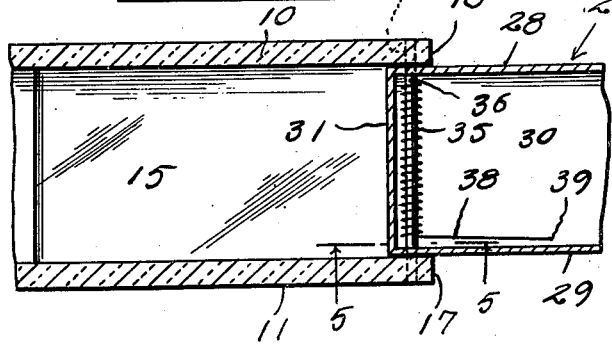

2,498,795

UNITED STATES PATENT OFFICE 2,498,795

DISPENSING DEVICE FOR BAIT

Douglas L. Davis, Fullerton, Calif.

Application June 6, 1946, Serial No. 674,730

2 Claims. (Cl. 222—364)

The present invention relates to improvements in receptacles and more particularly to means for delivering contents of the box outside thereof in successive intervals whilst restraining contents coming out together during any single interval.

The invention lends itself particularly for service and use in connection with delivering fisherman's bait out of a container in a manner consistent with obtaining outside of the container a single bait unit each time a door is opened for this purpose, whilst preventing another bait unit from leaving the interior of the box as this is being done.

One of the objects thereof is to provide a simple, efficient and inexpensive receptacle holding bait or similar contents and provided with dependable means for delivering the bait units, one at a time, or in a manner holding back some bait from coming out whilst causing desired bait to come out of the receptacle for placing upon the hook of a fishing line.

Another object thereof is to provide foolproof closure means for the bait holding container or receptacle which permits the opening, out of which the bait is delivered, to be closed before bait is extracted therefrom and immediately after the bait has been delivered outside of the box for accessibility.

A still further object thereof is to provide a container with a trap door so shaped, arranged and functioning that the doorway out of which bait is delivered by the trap door may be closed not only before operation of the trap door but as soon as the bait has been delivered by it outside of the doorway.

Another object thereof is to provide a bait delivering receptacle with a sector-shaped carrier for holding the bait which ejects bait from inside of the receptacle upon itself when it is positioned outside of the receptacle, which closes the receptacle opening from which the bait comes, when delivered, and which closes the same opening when it is repositioned inside of the receptacle ready for another operation of delivering bait.

A further object of this invention is to provide, in a container of the kind described, means for manually setting the bait delivering member within the container in operative position to deliver bait, together with means for manually actuating it to automatically eject bait out of the container.

Another object of this invention is to provide a container of approved shape with a trap door which in effect provides interchangeably operating closures for a doorway in the container. The disposition of the trap door in this container is such that when one closure thereof is moved into engagement with one side of the doorway, inside of the container, to close the doorway, the other closure thereof moves exteriorly of the container into shelf-forming position to receive and hold the bait delivered by the first named closure. When the first named closure is retracted or displaced from the doorway then the other and outside closure moves to close the doorway in turn. This assures that the doorway is only temporarily and intermittently unbarred at any time in the operation of the trap door, and when it is necessary to do this to prevent anything else coming out of the container in the act of delivering something therefrom.

With the above and other objects in view, my invention consists in the combination, arrangement and details of construction disclosed in the drawings and specification, and then more particularly pointed out in the appended claims.

In the drawings,

Wherein similar reference characters designate similar parts throughout the respective views, Figure 1 is a top plan view of my invention.

Figure 2 is a sectional elevation of my invention, taken on the line 2—2,

Figure 3 is a front elevation of the device shown in Figure 1,

Figure 4 is a fragmentary section taken on line 4—4 of Figure 2,

Figure 5 is a fragmentary sectional view taken on line 5—5 of Figure 4,

Figure 6 is a rear end elevation of a modified form of my invention, and

Figure 7 is a longitudinal sectional view taken on line 7—7 of Figure 6.

In the drawings, which are merely illustrative of my invention, the various parts of my invention are disclosed. It is well known that fishermen who are engaged in extensive bait fishing activities resort constantly to removing bait from a container. It has been found inconveniently unsuitable to use cans which are open to discharge the bait, unless the can is covered up in such a way that not too many bait will come out when the can is shaken for this purpose. This is hard to do in a time saving, serviceable manner. The present invention provides a container from which bait may be shaken out controlledly in a manner to instantly close the discharge opening in the container the moment bait has been shaken out.

The container or box is of any approved shape and design, being preferably rectangular in configuration. In Figure 7 is shown a single box, while in Figure 2 is shown a dual box having two compartments so that either end of the container may be employed to deliver the desired bait. Either style will be found equally effective when constructed in the following manner.

The box, rectangular in shape, consists of preferably plastic transparent side walls 10 and 11, a top wall 12. A central partition 14 may also be provided to divide the interior of the container into separate compartments as shown in Figure 2. The top of the container is formed with a plurality of tiny air holes 13. The bottom wall of the container is denoted at 15, and the front wall is designated 16. A doorway is cut into the front wall 16, the oppositely arranged side edges of which extend vertically and are designated 17, 18, while its top edge is designated 19. Its bottom surface is the bottom of the container.

The rear wall of the container is designated 20. It is formed also with a plurality of tiny holes or air ports 21. The holes 13 and 21 provide means for ventilating the interior of the box. The bottom wall 15 of the container, at a point between the ends of the container, is rabbeted out as at 22 in case a one compartment container is had, and at two intermediate points as at 22, 23, where a two compartment container is desired. The rabbeting out of the bottom wall 15 thins out this wall beginning with the ridge 22 or 23 and continuing to the front face of the container. This provides a seat 24 upon the bottom surface 25 of which may be registered one of the two radial sides of a sector shaped bait carrier now to be described.

This sector-shaped carrier is generally designated 27. A rod or pintle 26, as shown in Figure 4, has its ends fitted into the side walls 10 and 11 of the container rigidly so the rod may not turn. The sector-shaped carrier comprises, in construction, the sector-shaped oppositely arranged side walls 28, 29, the right angularly disposed radially disposed walls 30 and 31. It may be moulded out of plastic material in one transparent piece if desired. At the corner of the carrer in the angle made by radial walls 30, 31 thereof, the pintle or rod 26 passes through the side walls 28, 29 of the carrier for the purpose of pivotally mounting this carrier in the lower front corner of the container.

It will be seen that the rod or pintle 26 is positioned in the side walls of the container slightly above the bottom surface 25 of the rabbeted portion 24 of the bottom wall 15 of the container. It will also be seen that the radial walls 30, 31 of the sector shaped carrier are substantially of equal dimensions. As thus pivotally mounted in the container, either radial panel or wall 30 and 31 of the carrier constitutes a closure for the mentioned doorway at the front of the container designated by the arrow 31a in Figure 2. They are made long enough to overlie opposite sides of the doorway for interchangeably closing the doorway.

The sector-shaped carrier may readily be moved into and out of the container, being accommodated for swinging movement in the rabbeted portion 24 of the bottom of the container. The arcuate edges of the side walls 28 and 29 of the carrier are designated 32. A series of cross rods 33 have their ends connected operatively into these side walls 28, 29 of the carrier for bracing the same effectively if desired to do so. The space below the carrier and rabbeted surface 24 is designated in Figure 5 at 34. It allows the corner of the carrier to move therein as the carrier moves inside or outside of the container.

In order to be able, automatically, to actuate the sector shaped carrier, use is made of a coiled spring 35, which is wound around the rod 26, upon that part of it which spans the side walls 28, 29 of the carrier. One end of this spring, at one end of the rod, on the carrier, is secured or anchored rigidly into this rod. The other end of the spring 35 is provided with a terminal finger 38 which has its extreme outer end 39 operatively hooked into the bottom or radial wall 30 of the carrier. This spring holds the carrier outside of the container at all times under its own inertia.

It will be observed that a catch is provided over the doorway. It is a vertically slidable body 40 mounted in a suitable keeper 41 carried by the front wall 16 above the doorway, and it carries a suitably shaped handle 42 by means of which it may be grasped and moved upwardly or downwardly in the keeper. In Figure 7, it is seen that the front wall 16 is rabbeted out at 46 transversely of the doorway to provide a counterseat 44 for the radial wall or panel 30 of the sector-shaped carrier. This same front wall 16, as shown in Figure 2 and Figure 3, in a plane with the rabbeted portion 46, is chamfered out vertically as at 43 to form a groove in which the slide catch 40 is movable in countersunk relation in this wall 16.

The device operates as follows. The bait, whether worms, grasshoppers or the like are placed in the interior of the container or box, and located in either compartment thereof. To do this the sector-shaped carrier may be swung upon its pivotal pintle or rod 26 so wall 16 of the container is disposed midway between radial walls 30, 31 of the carrier. This exposes and renders accessible the upper plane of the doorway and enables the bait to be introduced into the interior of the container. The carrier has been swung against the tension of coiled spring 35, since upon raising radial wall 30 of the carrier, the finger 38 of the spring is also raised which is what tensions the spring. This spring normally holds this radial wall 30 outside of the container in forwardly projecting position where it, together with the side walls 28, 29, of the carrier, serve to confine and support the bait ejected from inside of the container. In this position of radial wall 30, the other perpendicularly disposed radial wall 31 engages and overlies the rear side of front wall 16 of the container and closes the doorway with a pressed fit. This prevents the worms or grasshoppers from crawling out of the box and confines them within the container, except when the carrier is actuated.

When the container is not in use for delivering bait, the carrier will be swung upon its pintle 26 so as to move radial back wall 31 downwardly in the interior of the container so it overlies the surface 24 of the rabbeted portion 24 of the bottom 15 of the box in countersunk relation, so its upper face is flush with the adjacent upper face the bottom 15 as shown in the left of Figure 2.

As this takes place the other radial wall 30, which has just been outside of the container, is moved upwardly so as to engage the outer side of front wall 16 of the box. This panel 30 will have its upper marginal edge countersunk overlapping in the rabbeted portion or seat 44 of this wall which will effectively close the doorway. As this carrier has thus been moved on its pivot pintle 26, spring 35 has again been put under tension or pressure. In order to hold the walls 30 and 31 of the carrier in respectively displaced and closing positions, the slide catch 40 is taken hold of and let or slid down in keeper 41 out of its confining groove 43 and made to overlie the back side of the radial wall 30 thus placed in a perpendicular position. This will prevent premature flying open of the carrier and will bar the doorway.

When it is desired to secure bait for attaching to hooks of fishing lines, the fisherman first takes hold of the container in his hands and lifts its rear end up and then shakes the container to locate bait upon the false bottom constituted by the radial wall 31 of the sector shaped carrier. He then slides the catch 40 upwardly in its keeper to deposit it in groove 43 and retract it from engagement with the radial wall 30 of the carrier. Immediately the catch 40 is released, the carrier flies open under the influence of spring 35 which now relaxes. What is done is—the radial wall 31 is raised out of rabbeted portion 24 of the bottom 15 of the box, and swung upon its pintle 26, to perpendicular position. Whatever bait rested upon this wall has quickly been carried or ejected out of the interior of the box and deposited upon the outside of this wall 31 or else upon the wall 31 thereof which has now assumed a horizontal shelf-like appearance. This expulsion of bait from inside of the container is instantaneous because the spring snaps back as quickly, and impacts the wall or trap door 31 against the back side of the front wall 16. This flash-like operation of the sector-shaped carrier effectually serves the purpose of confining within the box the bait that was not adhering to the upwardly moving part of the carrier in its doorway closing movement. Any surplus bait ejected may readily be retransferred back into the interior of the box by slightly raising the carrier outside of the box.

It will be seen from Figure 3 that an eyelet A is secured into the upper end of the front side of the case. A chain or string B is attached to this eyelet for convenience in securing the device to assure it will not be lost.

I do not intend to confine myself to the exact details of construction herein disclosed but will cover all variations falling within the purview of the appended claims.

What I desire to claim and secure by patent is:

1. A fisherman's bait box comprising top, bottom, side and end walls, said bottom wall formed with an upwardly opening recess at one end thereof, one of said end walls formed with an opening therethrough at the lower end registering with an end of said recess, said one end wall also formed with a recess along the upper marginal edge of said opening, a carrier, a pivot for said carrier in the corner of said box above said recess, a pair of right angularly related closure forming walls on said carrier extending radially from said pivot, spaced apart segmental arcuate side walls on said carrier, said closure forming walls disposed on opposite sides of said one end wall, the upper end of said closure forming walls being adapted to abut the upper marginal edge of said opening, the inner of said closure forming walls being swingable for disposition in the recess of said bottom wall, the upper edge of the outer of said closure forming walls engageable in said marginal recess, and spring means biasing said inner closure wall from its associated recess for closing said opening in the said one end wall.

2. A fisherman's bait box as set forth in claim 1 including a latch on said one end wall engageable with said outer closure forming wall securing said outer wall in closed position over the opening of said one end wall.

DOUGLAS L. DAVIS.

REFERENCES CITED

The following references are of record in the file of this patent:

UNITED STATES PATENTS

| Number | Name | Date |
| --- | --- | --- |
| 503,722 | Lewis et al. | Aug. 22, 1893 |
| 1,938,519 | Deffenbaugh | Dec. 5, 1933 |
| 2,050,756 | Kubo | Aug. 11, 1936 |
| 2,102,772 | Watts | Dec. 21, 1937 |
| 2,121,516 | Woo | June 21, 1938 |
| 2,160,436 | Jones | May 30, 1939 |